(12) United States Patent
Valine et al.

(10) Patent No.: US 10,949,426 B2
(45) Date of Patent: *Mar. 16, 2021

(54) ANNOTATING TIME SERIES DATA POINTS WITH ALERT INFORMATION

(71) Applicant: salesforce.com, inc., San Francisco, CA (US)

(72) Inventors: Thomas Nicholas Valine, San Jose, CA (US); Bhinav Sura, San Mateo, CA (US); Anand Subramanian, San Francisco, CA (US); Rajavardhan Sarkapally, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 229 days.

This patent is subject to a terminal disclaimer.

(21) Appl. No.: 14/980,450

(22) Filed: Dec. 28, 2015

(65) Prior Publication Data

US 2017/0185597 A1    Jun. 29, 2017

(51) Int. Cl.
*G06F 16/24* (2019.01)
*G06F 16/2455* (2019.01)

(52) U.S. Cl.
CPC .............. *G06F 16/24565* (2019.01)

(58) Field of Classification Search
CPC ............ G06F 17/3051; G06F 16/658
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,065,014 A | 5/2000 | Wakio et al. |
| 6,092,083 A | 7/2000 | Brodersen et al. |
| 6,161,149 A | 12/2000 | Achacoso et al. |
| 6,169,534 B1 | 1/2001 | Raffel et al. |

(Continued)

OTHER PUBLICATIONS

U.S. Appl. No. 13/986,251, filed Apr. 16, 2013.

*Primary Examiner* — Mohammad S Rostami

(74) *Attorney, Agent, or Firm* — Dergosits & Noah LLP; Todd A. Noah

(57) ABSTRACT

Annotating time series data points with alert information is described. A system retrieves a time series data point and a corresponding alert trigger condition from a time series database. The system evaluates whether the time series data point meets the corresponding alert trigger condition. The system outputs an alert notification associated with the time series data point and the corresponding alert trigger condition if the time series data point meets the corresponding alert trigger condition. The system annotates the time series data point, in the time series database, with alert information associated with the corresponding alert trigger condition if the time series data point meets the corresponding alert trigger condition.

17 Claims, 4 Drawing Sheets

(56) References Cited

U.S. PATENT DOCUMENTS

| | | |
|---|---|---|
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,554,699 B2 | 10/2013 | Ruhl et al. |
| 8,566,301 B2 | 10/2013 | Rueben et al. |
| 8,646,103 B2 | 2/2014 | Jakobson et al. |
| 8,682,773 B1* | 3/2014 | Murphy ............... G06Q 40/00 705/36 R |
| 9,128,965 B1* | 9/2015 | Yanacek ............. G06F 16/955 |
| 9,317,539 B2* | 4/2016 | Sato ............. G06F 17/30289 |
| 9,516,053 B1* | 12/2016 | Muddu ............. G06F 16/254 |
| 9,753,935 B1* | 9/2017 | Tobin ............. G06F 17/30554 |
| 9,848,007 B2 | 12/2017 | Chen et al. |
| 10,476,903 B2 | 11/2019 | Wilson |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0130811 A1* | 7/2003 | Boerhout ............. G01H 1/003 702/56 |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0154914 A1* | 6/2008 | Kan ............. G06F 11/1458 |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2009/0216979 A1 | 8/2009 | Balasubramanian et al. |
| 2010/0131533 A1* | 5/2010 | Ortiz ............. G06F 16/58 707/758 |
| 2011/0119226 A1* | 5/2011 | Ruhl ............. G06F 17/3089 706/52 |
| 2011/0231248 A1 | 9/2011 | Vee et al. |
| 2012/0066224 A1* | 3/2012 | Kamath ............. G06F 9/4494 707/737 |
| 2012/0233137 A1 | 9/2012 | Jakobson et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0326109 A1 | 12/2013 | Kivity |
| 2014/0032506 A1 | 1/2014 | Hoey et al. |
| 2014/0039683 A1 | 2/2014 | Zimmermann et al. |
| 2014/0040276 A1 | 2/2014 | Chen et al. |
| 2014/0149466 A1 | 5/2014 | Sato et al. |
| 2014/0337474 A1 | 11/2014 | Khuti et al. |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |
| 2015/0112900 A1* | 4/2015 | Ariyoshi ............. G06N 20/00 706/12 |
| 2015/0172563 A1 | 6/2015 | Jakobson et al. |
| 2015/0205691 A1* | 7/2015 | Seto ............. G06F 11/008 702/182 |

(56) References Cited

U.S. PATENT DOCUMENTS

| | | | |
|---|---|---|---|
| 2016/0062950 A1* | 3/2016 | Brodersen | G06F 17/18 702/181 |
| 2016/0065604 A1* | 3/2016 | Chen | H04L 63/1425 726/23 |
| 2016/0092484 A1* | 3/2016 | Finkler | G06F 16/2272 707/715 |
| 2016/0092516 A1* | 3/2016 | Poola | G06F 16/2379 707/776 |
| 2016/0098176 A1 | 4/2016 | Cervelli et al. | |
| 2016/0103908 A1* | 4/2016 | Fletcher | H04L 41/5009 707/722 |
| 2016/0203036 A1 | 7/2016 | Mezic et al. | |
| 2016/0224660 A1 | 8/2016 | Munk et al. | |
| 2016/0317781 A1* | 11/2016 | Proud | A61M 21/02 |
| 2016/0321906 A1* | 11/2016 | Whitney | G06F 40/14 |
| 2016/0342910 A1* | 11/2016 | Chu | G06Q 10/063 |
| 2016/0370946 A1 | 12/2016 | Hama et al. | |
| 2016/0378753 A1 | 12/2016 | Taylor et al. | |
| 2017/0148264 A1 | 5/2017 | Pichette et al. | |
| 2017/0177636 A1 | 6/2017 | Nguyen et al. | |

* cited by examiner

ANNOTATING TIME SERIES DATA POINTS WITH ALERT INFORMATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Time series data is a sequence of data points, typically consisting of successive measurements made over a time interval. Examples of time series data are ocean tides, counts of sunspots, and the daily closing value of the Dow Jones Industrial Average. Time series data is frequently plotted via line charts. Many domains of applied science and engineering which involve temporal measurements use time series data. Time series data analysis comprises methods for analyzing time series data in order to extract meaningful statistics and other characteristics of the data. Time series data forecasting is the use of a model to predict future values based on previously observed values. A time series database is a computer system that is optimized for handling time series data. In some fields, time series data is called a profile, a curve, or a trace. Despite the disparate names, many of the same mathematical operations, queries, or database transactions are useful for analyzing each of these time series data types. The implementation of a computerized database system that can correctly, reliably, and efficiently implement these operations must be specialized for time series data.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Figure 1:
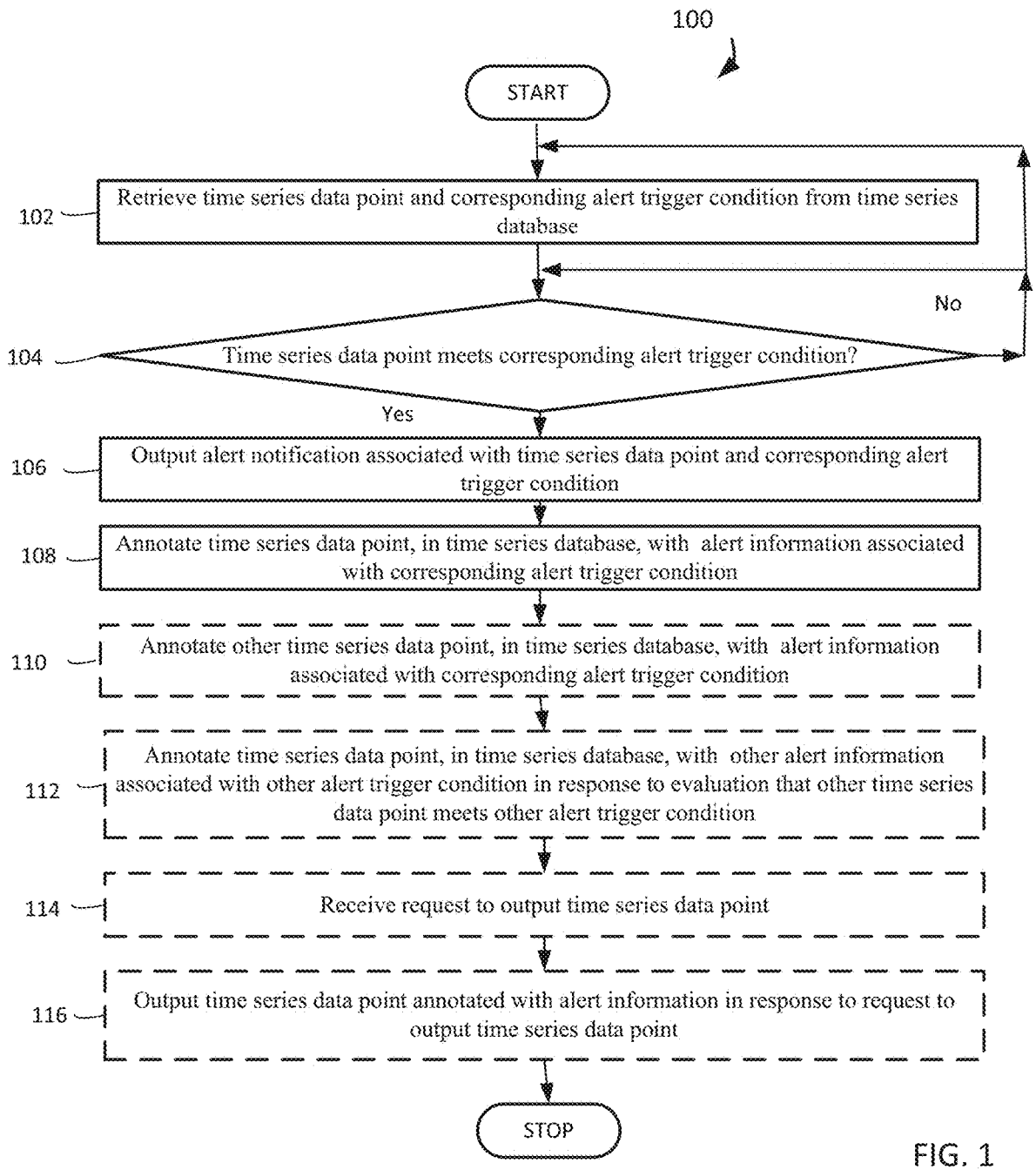
FIG. 1 is an operational flow diagram illustrating a high level overview of a method for annotating time series data points with alert information, in an embodiment.

Systems and methods are provided for annotating time series data points with alert information. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. Next, mechanisms and methods for annotating time series data points with alert information will be described with reference to example embodiments. The following detailed description will first describe a method for annotating time series data points with alert information. Next, an example frame of an example user interface screen of a display device for annotating time series data points with alert information is described.

In accordance with embodiments described herein, there are provided systems and methods for annotating time series data points with alert information. A system retrieves a time series data point and a corresponding alert trigger condition from a database having time series data. The system evaluates whether the time series data point meets the corresponding alert trigger condition. The system outputs an alert notification associated with the time series data point and the corresponding alert trigger condition if the time series data point meets the corresponding alert trigger condition. The system annotates the time series data point, in the time series database, with alert information associated with the corresponding alert trigger condition if the time series data point meets the corresponding alert trigger condition.

For example, a system retrieves a time series data point indicating the percentage of free physical memory for a cluster of computers and a corresponding alert trigger condition based on the percentage of free physical memory for the cluster of computers falling below 5% for 5 consecutive minutes. The system evaluates whether the time series data point indicating the percentage of free physical memory for a cluster of computers meets the corresponding alert trigger condition by falling below 5% for 5 consecutive minutes. The system outputs an alert email to inform a system administrator that at 11:05 A.M. the percentage of free physical memory for the cluster of computers has been below 5% for 5 consecutive minutes. The system annotates the time series data point indicating the percentage of free physical memory for the cluster of computers to indicate that the percentage of free physical memory for the cluster of computers was below 5% from 11:00 A.M. to 11:05 A.M and generated the alert email.

The system can respond to any subsequent requests for the time series data point indicating the percentage of free physical memory for the cluster of computers by outputting not only the requested time series data point, but also by outputting the annotations that indicate that the percentage of free physical memory for the cluster of computers was below 5% from 11:00 A.M. to 11:05 A.M and generated the alert email. By annotating time series data points with alert information, the system can enable a system administrator to identify where anomalies occurred in the time series data and discover the underlying causes of alerts.

While one or more implementations and techniques are described with reference to an embodiment in which annotating time series data points with alert information is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

Figure 2:
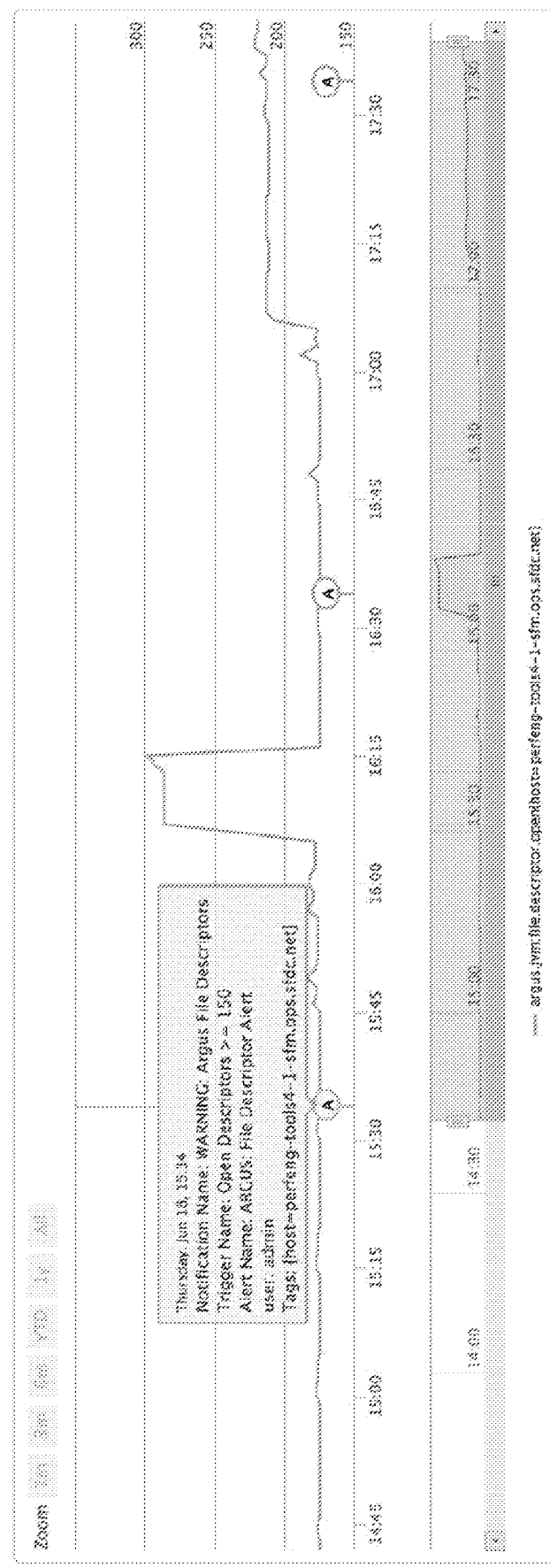
FIG. 2 is a screen shot illustrating a frame of an example user interface screen of a display device supporting methods for annotating time series data points with alert information, in an embodiment.

FIG. 1 is an operational flow diagram illustrating a high level overview of a method 100 for annotating time series data points with alert information. The example of a frame of an example user interface screen of a display device, which is described below in reference to FIG. 1 is depicted in FIG. 2 and described below in reference to FIG. 2.

A system retrieves a time series data point and a corresponding alert trigger condition from a time series database, block 102. One skilled in the art will understand that a time series database is a computer system that is optimized for handling time series data, but may be able to handle other data as well. For example and without limitation, this can include a system retrieving the time series data point indicating the percentage of free physical memory for a cluster of computers and the corresponding alert trigger condition based on the percentage of free physical memory for the cluster of computers falling below 5% for 5 consecutive minutes. Although this example describes the system retrieving a time series data point with only one corresponding alert trigger condition, the system can retrieve a time series data point with multiple different alert trigger conditions.

The system evaluates whether the time series data point meets the corresponding alert trigger condition, block 104. By way of example and without limitation, this can include the system evaluating whether the time series data point indicating the percentage of free physical memory for the cluster of computers meets the corresponding alert trigger condition by falling below 5% for 5 consecutive minutes. While this example describes the system evaluating a time series data point that is a compound time series data point based on a combinations of time series data points from each computer in a cluster of computers, the system may also evaluate a single time series data point from a single time series data point source. Although this example describes an alert trigger condition based on a time series data point meeting an alert threshold for 5 consecutive minutes, the alert trigger condition may be met when a time series data point meets an alert threshold only once, or when a time series data point meets an alert threshold any number of times in any time period, such as by meeting an alert threshold at least 7 times in any time period of 13 consecutive minutes. Even though this example describes the system evaluating a time series data point on a minute-to-minute basis, the periodic evaluation period may be of any time duration, such as seconds or hours.

Whereas the foregoing example describes the system evaluating a time series data point based on only one corresponding alert trigger condition, the system may evaluate a time series data point based on multiple different corresponding alert trigger conditions. If the time series data point does not meet the alert trigger condition, the method 100 remains at block 104 to evaluate whether the time series data point meets another corresponding alert trigger condition or returns to block 102 to evaluate whether another time series data point meets its own corresponding alert trigger condition. If the time series data point meets the alert trigger condition, the method 100 proceeds to block 106 to output an alert notification.

If the time series data point meets the corresponding alert trigger condition, the system outputs an alert notification associated with the time series data point and the corresponding alert trigger condition, block 106. In embodiments, this can include the system outputting an alert email to inform a system administrator that at 11:05 A.M. the percentage of free physical memory for the cluster of computers has been below 5% for 5 consecutive minutes, but does not repeat a similar alert email to the system administrator until 11:10 A.M. even if the percentage of free physical memory for the cluster of computers continues to remain below 5%.

Waiting any specific amount of time to send additional alert notifications is referred to as a cool down period, which enables a system administrator to take action on a previous alert notification without bombarding the system administrator with a seemingly endless supply of alert notifications while the corresponding time series data points continue to meet the corresponding alert trigger condition. Although this example describes the system communicating an alert notification via an email, the system may communicate an alert notification via any combination of communications including emails, text messages, display screen updates, audible alarms, social network posts, tweets, writes to database records, etc. The system may also communicate an alert notification to a computer system, even the time series database system itself, in the form of control feedback, such that the computer system receiving the alert notification can take an action to mitigate an imminent failure.

If the time series data point meets the corresponding alert trigger condition, the system annotates the time series data point, in the time series database, with alert information associated with the corresponding alert trigger condition, block 108. For example and without limitation, this can include the system annotating the time series data point indicating the percentage of free physical memory for the cluster of computers, which is already stored in the time series database, to indicate that the percentage of free physical memory for the cluster of computers was below 5% from 11:00 A.M. to 11:12 A.M. and generated the alert email. In addition to annotating the time series data point indicating the percentage of free physical memory for the cluster of computers at 11:05 A.M. after the corresponding time series data points met the alert trigger condition for the required 5 minutes, the system may also retroactively annotate the corresponding time series data points for 11:00 A.M. to 11:004 A.M. to indicate that these corresponding time series data points were also responsible for meeting this alert trigger condition, even though this alert trigger condition was not fully met until 5 consecutive minutes of these corresponding time series data points met this alert trigger condition by 11:05 A.M.

The time series data point annotated with the alert information may be subsequently observed via a data query and/or displayed as a visualization of the time series data point with overlaid annotations, such as the displayed frame of an example user interface screen of a display device depicted in FIG. 2 and described below in reference to FIG. 2. The same system sub-component, such as a notifier interface, which received the time series data point and the alert information and output the alert notification, may also annotate the time series data point with the alert information.

If the time series data point meets the corresponding alert trigger condition, the system optionally annotates another time series data point, in the time series database, with the alert information associated with the corresponding alert trigger condition, block 110. By way of example and without limitation, this can include the system annotating each of the individual time series data points indicating the percentage of free physical memory for each individual computer in the cluster of computers with the same alert information. Although this example describes the system annotating related time series data points with the same alert information, the system may also annotate apparently unrelated time series data points with the same alert information. Annotating apparently unrelated time series data points may assist in correlating a specific alert trigger condition being met with other time series data points that were not previously suspected of having any indirect effect on meeting the specific alert trigger condition. This annotation may also assist a system administrator in troubleshooting efforts.

Having annotated the time series data point with the alert information associated with the corresponding alert trigger condition, the system optionally annotates the time series data point, in the time series database, with other alert information associated with another alert trigger condition in response to an evaluation that another time series data point meets the other alert trigger condition, block 112. In embodiments, this can include the system annotating the time series data point indicating the percentage of free physical memory for the cluster of computers with alert information for a time series data point indicating the number of open file descriptors meeting the alert trigger condition of 150 open file descriptors. Conventional time series database systems that permit annotation of time series data points only support a single annotation for a time series data point because these prior annotations are typically used to annotate time series data points with information indicating that a new release is rolled out. These prior art time series database systems are configured on the premise that there is a one-to-one correspondence between a time series data point being evaluated against an alert trigger condition and the time series data point being annotated, such that a time series data point is only annotated with alert information for a single alert condition, instead of alert information for multiple alert trigger conditions. However, embodiments of the present disclosure support multiple annotations for each time series data point, such as by using a custom map for each time series data point that is annotated with alert information based on different alert trigger conditions.

After annotating the time series data point with alert information, the system optionally receives a request to output the time series data point, block 114. For example and without limitation, this can include the system receiving a request from a system administrator to output the time series data point indicating the percentage of free physical memory for the cluster of computers at 11:05 A.M.

After receiving a request to output the time series data point, the system optionally outputs the time series data point annotated with the alert information in response to the request to output the time series data point, block 116. By way of example and without limitation, this can include the system responding to the request for the time series data point indicating the percentage of free physical memory for the cluster of computers at 11:05 A.M. by outputting not only the requested time series data point, but also by outputting the annotations that indicate that the percentage of free physical memory for the cluster of computers was below 5% from 11:00 A.M. to 11:12 A.M. and generated the alert email.

The method 100 may be repeated as desired. Although this disclosure describes the blocks 102-116 executing in a particular order, the blocks 102-116 may be executed in a different order. In other implementations, each of the blocks 102-116 may also be executed in combination with other blocks and/or some blocks may be divided into a different set of blocks.

FIG. 2 is a screen shot illustrating a frame 200 of an example user interface screen of a display device for annotating time series data points with alert information, under an embodiment. The frame 200 is an output of not only a requested time series data point, but also the output of annotations of alert information for the requested time series data point. The frame 200 depicts a line chart of time series data that is annotated with alert information indicating when the number of open file descriptors exceeded 150.

The frame 200 may be part of a larger display screen that includes fields for users to enter commands to create, retrieve, edit, and store records. Because the frame 200 is a sample, the frame 200 could vary greatly in appearance. For example, the relative sizes and positioning of the text is not important to the practice of the present disclosure. The frame 200 can be depicted by any visual displays, but is preferably depicted by computer screens. The frame 200 could also be output as a report and printed or saved in an electronic format, such as PDF. The frame 200 can be part of a personal computer system and/or a network, and operated from system data received by the network, and/or on the Internet. The frame 200 may be navigable by a user. Typically, a user can employ a touch screen input or a mouse input device to point-and-click to locations on the frame 200 to manage the text on the frame 200, such as a selection that enables a user to edit the text. Alternately, a user can employ directional indicators, or other input devices such as a keyboard. The text depicted by the frame 200 is an example, as the frame 200 may include much greater amounts of text. The frame 200 may also include fields in which a user can input textual information.

System Overview

Figure 3:
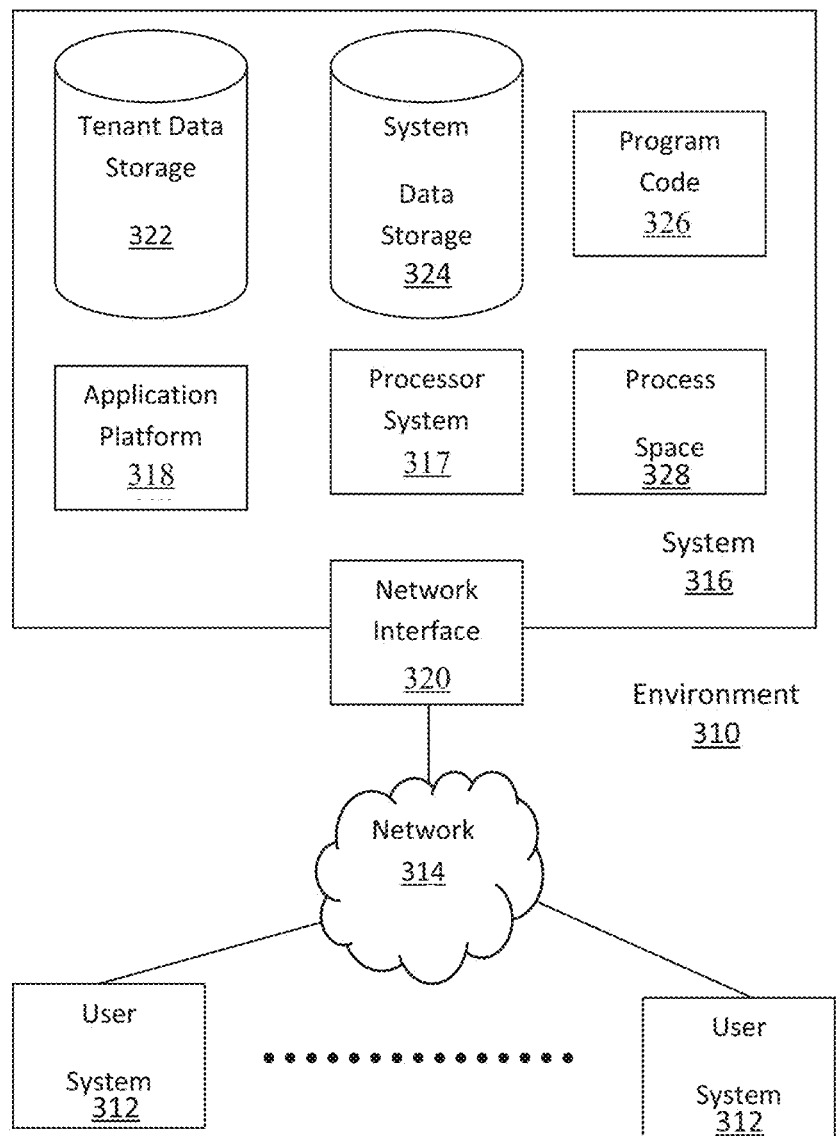
FIG. 3 illustrates a block diagram of an example of an environment wherein an on-demand database service might be used.

FIG. 3 illustrates a block diagram of an environment 310 wherein an on-demand database service might be used. The environment 310 may include user systems 312, a network 314, a system 316, a processor system 317, an application platform 318, a network interface 320, a tenant data storage 322, a system data storage 324, program code 326, and a process space 328. In other embodiments, the environment 310 may not have all of the components listed and/or may have other elements instead of, or in addition to, those listed above.

The environment 310 is an environment in which an on-demand database service exists. A user system 312 may be any machine or system that is used by a user to access a database user system. For example, any of the user systems 312 may be a handheld computing device, a mobile phone, a laptop computer, a work station, and/or a network of computing devices. As illustrated in FIG. 3 (and in more detail in FIG. 4) the user systems 312 might interact via the network 314 with an on-demand database service, which is the system 316.

An on-demand database service, such as the system 316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 316" and the "system 316" will be used interchangeably herein. A database image may include one or more database objects. A relational database management system (RDMS) or the equivalent may execute storage and retrieval of information against the database object(s). The application platform 318 may be a framework that allows the applications of the system 316 to run, such as the hardware and/or software, e.g., the operating system. In an embodiment, the on-demand database service 316 may include the application platform 318 which enables creation, managing and executing one or more applications developed by the provider of the on-demand database service, users accessing the on-demand database service via user systems 312, or third party application developers accessing the on-demand database service via the user systems 312.

The users of the user systems 312 may differ in their respective capacities, and the capacity of a particular user system 312 might be entirely determined by permissions (permission levels) for the current user. For example, where a salesperson is using a particular user system 312 to interact with the system 316, that user system 312 has the capacities allotted to that salesperson. However, while an administrator is using that user system 312 to interact with the system 316, that user system 312 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 314 is any network or combination of networks of devices that communicate with one another. For example, the network 314 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 312 might communicate with the system 316 using TCP/IP and, at a higher network level, use other common Internet protocols to communicate, such as HTTP, FTP, AFS, WAP, etc. In an example where HTTP is used, the user systems 312 might include an HTTP client commonly referred to as a "browser" for sending and receiving HTTP messages to and from an HTTP server at the system 316. Such an HTTP server might be implemented as the sole network interface between the system 316 and the network 314, but other techniques might be used as well or instead. In some implementations, the interface between the system 316 and the network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 316, shown in FIG. 3, implements a web-based customer relationship management (CRM) system. For example, in one embodiment, the system 316 includes application servers configured to implement and execute CRM software applications as well as provide related data, code, forms, webpages and other information to and from the user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 316 implements applications other than, or in addition to, a CRM application. For example, the system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of the system 316 is shown in FIG. 3, including the network interface 320, the application platform 318, the tenant data storage 322 for tenant data 323, the system data storage 324 for system data 325 accessible to the system 316 and possibly multiple tenants, the program code 326 for implementing various functions of the system 316, and the process space 328 for executing MTS system processes and tenant-specific processes, such as running applications as part of an application hosting service. Additional processes that may execute on the system 316 include database indexing processes.

Several elements in the system shown in FIG. 3 include conventional, well-known elements that are explained only briefly here. For example, each of the user systems 312 could include a desktop personal computer, workstation, laptop, PDA, cell phone, or any wireless access protocol (WAP) enabled device or any other computing device capable of interfacing directly or indirectly to the Internet or other network connection. Each of the user systems 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 312 to access, process and view information, pages and applications available to it from the system 316 over the network 314. Each of the user systems 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 316 or other systems or servers. For example, the user interface device may be used to access data and applications hosted by the system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each of the user systems 312 and all of its components are operator configurable using applications, such as a browser, including computer code run using a central processing unit such as an Intel Pentium® processor or the like. Similarly, the system 316 (and additional instances of an MTS, where more than one is present) and all of their components might be operator configurable using application(s) including computer code to run using a central processing unit such as the processor system 317, which may include an Intel Pentium® processor or the like, and/or multiple processor units. A computer program product embodiment includes a machine-readable storage medium (media) having instructions stored thereon/ in which can be used to program a computer to perform any of the processes of the embodiments described herein. Computer code for operating and configuring the system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 316 is configured to provide webpages, forms, applications, data and media content to the user (client) systems 312 to support the access by the user systems 312 as tenants of the system 316. As such, the system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 4:
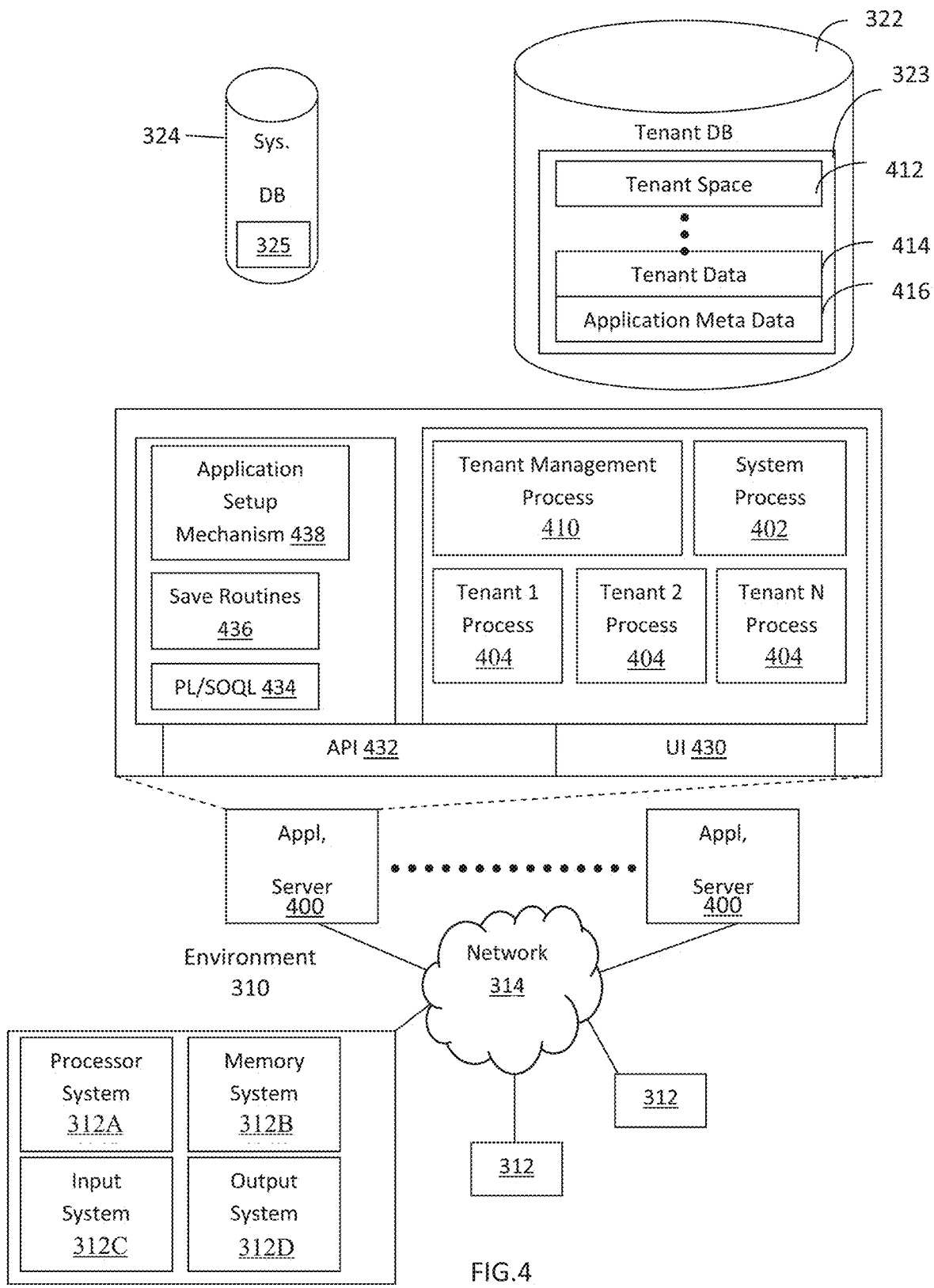
FIG. 4 illustrates a block diagram of an embodiment of elements of FIG. 3 and various possible interconnections between these elements.

FIG. 4 also illustrates the environment 310. However, in FIG. 4 elements of the system 316 and various interconnections in an embodiment are further illustrated. FIG. 4 shows that the each of the user systems 312 may include a processor system 312A, a memory system 312B, an input system 312C, and an output system 312D. FIG. 4 shows the network 314 and the system 316. FIG. 4 also shows that the system 316 may include the tenant data storage 322, the tenant data 323, the system data storage 324, the system data 325, a User Interface (UI) 430, an Application Program Interface (API) 432, a PL/SOQL 434, save routines 436, an application setup mechanism 438, applications servers 4001-400N, a system process space 402, tenant process spaces 404, a tenant management process space 410, a tenant storage area 412, a user storage 414, and application metadata 416. In other embodiments, the environment 310 may not have the same elements as those listed above and/or may have other elements instead of, or in addition to, those listed above.

The user systems 312, the network 314, the system 316, the tenant data storage 322, and the system data storage 324 were discussed above in FIG. 3. Regarding the user systems 312, the processor system 312A may be any combination of one or more processors. The memory system 312B may be any combination of one or more memory devices, short term, and/or long term memory. The input system 312C may be any combination of input devices, such as one or more keyboards, mice, trackballs, scanners, cameras, and/or interfaces to networks. The output system 312D may be any combination of output devices, such as one or more monitors, printers, and/or interfaces to networks. As shown by FIG. 4, the system 316 may include the network interface 320 (of FIG. 3) implemented as a set of HTTP application servers 400, the application platform 318, the tenant data storage 322, and the system data storage 324. Also shown is the system process space 402, including individual tenant process spaces 404 and the tenant management process space 410. Each application server 400 may be configured to access tenant data storage 322 and the tenant data 323 therein, and the system data storage 324 and the system data 325 therein to serve requests of the user systems 312. The tenant data 323 might be divided into individual tenant storage areas 412, which can be either a physical arrangement and/or a logical arrangement of data. Within each tenant storage area 412, the user storage 414 and the application metadata 416 might be similarly allocated for each user. For example, a copy of a user's most recently used (MRU) items might be stored to the user storage 414. Similarly, a copy of MRU items for an entire organization that is a tenant might be stored to the tenant storage area 412. The UI 430 provides a user interface and the API 432 provides an application programmer interface to the system 316 resident processes to users and/or developers at the user systems 312. The tenant data and the system data may be stored in various databases, such as one or more Oracle™ databases.

The application platform 318 includes the application setup mechanism 438 that supports application developers' creation and management of applications, which may be saved as metadata into the tenant data storage 322 by the save routines 436 for execution by subscribers as one or more tenant process spaces 404 managed by the tenant management process 410 for example. Invocations to such applications may be coded using the PL/SOQL 434 that provides a programming language style interface extension to the API 432. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 416 for the subscriber making the invocation and executing the metadata as an application in a virtual machine.

Each application server 400 may be communicably coupled to database systems, e.g., having access to the system data 325 and the tenant data 323, via a different network connection. For example, one application server 4001 might be coupled via the network 314 (e.g., the Internet), another application server 400N-1 might be coupled via a direct network link, and another application server 400N might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, the system 316 is multi-tenant, wherein the system 316 handles storage of, and access to, different objects, data and applications across disparate users and organizations.

As an example of storage, one tenant might be a company that employs a sales force where each salesperson uses the system 316 to manage their sales process. Thus, a user might maintain contact data, leads data, customer follow-up data, performance data, goals and progress data, etc., all applicable to that user's personal sales process (e.g., in the tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 316 might also maintain system level data usable by multiple tenants or other data. Such system level data might include industry reports, news, postings, and the like that are sharable among tenants.

In certain embodiments, the user systems 312 (which may be client systems) communicate with the application servers 400 to request and update system-level and tenant-level data from the system 316 that may require sending one or more queries to the tenant data storage 322 and/or the system data storage 324. The system 316 (e.g., an application server 400 in the system 316) automatically generates one or more SQL statements (e.g., one or more SQL queries) that are designed to access the desired information. The system data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system for annotating time series data points with alert information, the apparatus comprising:
   one or more processors; and
   a non-transitory computer readable medium storing a plurality of instructions, which when executed, cause the one or more processors to:
   retrieve a time series data point and a corresponding alert trigger condition from a time series database;
   evaluate whether the time series data point meets the corresponding alert trigger condition;
   output an alert notification associated with the time series data point and the corresponding alert trigger condition when the time series data point meets the corresponding alert trigger condition;
   store alert information, which annotates the time series data point, in the time series database from which the time series data point and the corresponding alert trigger condition were initially retrieved, the alert information being a historical record that identifies the corresponding alert trigger condition and a time period when the time series data point had met the corresponding alert trigger condition; and
   output, in response to a query for the time series database to output the time series data point, the time series data point annotated with the alert information from the time series database.

2. The system of claim 1, wherein the time series data point is based on a first time series data point associated with a specific time and a second time series data point associated with the specific time.

3. The system of claim 1, wherein evaluating whether the time series data point meets the corresponding alert trigger condition comprises evaluating whether another time series data point associated with the time series data point and a first time, and the time series data point associated with a second time, each meet the trigger condition during a time period which comprises the first time and the second time.

4. The system of claim 1, wherein outputting the alert notification associated with the time series data point and the corresponding alert trigger condition comprises determining whether an alert notifier is in a cooldown period for the alert notification, and outputting the alert notification associated with the time series data point and the corresponding alert trigger condition in response to a determination that the alert notifier is not in a cooldown period for the alert notification.

5. The system of claim 1, comprising further instructions, which when executed, cause the one or more processors to annotate another time series data point, in the time series database, with the alert information associated with the corresponding alert trigger condition when the time series data point meets the corresponding alert trigger condition.

6. The system of claim 1, comprising further instructions, which when executed, cause the one or more processors to annotate the time series data point, in the time series database, with other alert information associated with another alert trigger condition when another time series data point meets the other alert trigger condition.

7. A computer program product comprising computer-readable program code to be executed by one or more processors when retrieved from a non-transitory computer-readable medium, the program code including instructions to:
   retrieve a time series data point and a corresponding alert trigger condition from a time series database;
   evaluate whether the time series data point meets the corresponding alert trigger condition;
   output an alert notification associated with the time series data point and the corresponding alert trigger condition when the time series data point meets the corresponding alert trigger condition;
   store alert information, which annotates the time series data point, in the time series database from which the time series data point and the corresponding alert trigger condition were initially retrieved, the alert information being a historical record that identifies the corresponding alert trigger condition and a time period when the time series data point had met the corresponding alert trigger condition; and
   output, in response to a query for the time series database to output the time series data point, the time series data point annotated with the alert information from the time series database.

8. The computer program product of claim 7, wherein the time series data point is based on a first time series data point associated with a specific time and a second time series data point associated with the specific time, and wherein outputting the alert notification associated with the time series data point and the corresponding alert trigger condition comprises determining whether an alert notifier is in a cooldown period for the alert notification, and outputting the alert notification associated with the time series data point and the corresponding alert trigger condition when the alert notifier is not in a cooldown period for the alert notification.

9. The computer program product of claim 7, wherein evaluating whether the time series data point meets the corresponding alert trigger condition comprises evaluating whether another time series data point associated with the time series data point and a first time, and the time series data associated with a second time, each meet the trigger condition during a time period which comprises the first time and the second time.

10. The computer program product of claim 7, wherein the program code comprises further instructions to annotate another time series data point, in the time series database, with the alert information associated with the corresponding alert trigger condition when the time series data point meets the corresponding alert trigger condition.

11. The computer program product of claim 7, wherein the program code comprises further instructions to annotate the time series data point, in the time series database, with other alert information associated with another alert trigger condition when another time series data point meets the other alert trigger condition.

12. A method for annotating time series data points with alert information, the method comprising:

retrieving a time series data point and a corresponding alert trigger condition from a time series database;

evaluating whether the time series data point meets the corresponding alert trigger condition;

outputting an alert notification associated with the time series data point and the corresponding alert trigger condition when the time series data point meets the corresponding alert trigger condition;

storing alert information, which annotates the time series data point, in the time series database from which the time series data point and the corresponding alert trigger condition were initially retrieved, the alert information being a historical record that identifies the corresponding alert trigger condition and a time period when the time series data point had met the corresponding alert trigger condition; and outputting, in response to a query for the time series database to output the time series data point, the time series data point annotated with the alert information from the time series database.

13. The method of claim 12, wherein the time series data point is based on a first time series data point associated with a specific time and a second time series data point associated with the specific time.

14. The method of claim 12, wherein evaluating whether the time series data point meets the corresponding alert trigger condition comprises evaluating whether another time series data point associated with the time series data point and a first time, and the time series data associated point associate with a second time, each meet the trigger condition during a time period which comprises the first time and the second time.

15. The method of claim 12, wherein outputting the alert notification associated with the time series data point and the corresponding alert trigger condition comprises determining whether an alert notifier is in a cooldown period for the alert notification, and outputting the alert notification associated with the time series data point and the corresponding alert trigger condition when the alert notifier is not in a cooldown period for the alert notification.

16. The method of claim 12, wherein the method further comprises annotating another time series data point, in the time series database, with the alert information associated with the corresponding alert trigger condition when the evaluation that the time series data point meets the corresponding alert trigger condition.

17. The method of claim 12, wherein the method further comprises annotating the time series data point, in the time series database, with other alert information associated with another alert trigger condition when another time series data point meets the other alert trigger condition.

* * * * *